United States Patent
Dewaghe et al.

(10) Patent No.: US 12,391,610 B2
(45) Date of Patent: Aug. 19, 2025

(54) LIME MILK

(71) Applicant: Carmeuse Research and Technology, Louvain-la-Neuve (BE)

(72) Inventors: Celine Dewaghe, Montigny le Tilleul (BE); Francois Ponchon, Uccle (BE); Nicolas Vekony, Chastre (BE)

(73) Assignee: Carmeuse Research and Technology, Louvain-la-Neuve (BE)

( * ) Notice: Subject to any disclaimer, the term of this patent is extended or adjusted under 35 U.S.C. 154(b) by 820 days.

(21) Appl. No.: 17/291,296

(22) PCT Filed: Nov. 5, 2019

(86) PCT No.: PCT/EP2019/080170
§ 371 (c)(1),
(2) Date: May 5, 2021

(87) PCT Pub. No.: WO2020/094607
PCT Pub. Date: May 14, 2020

(65) Prior Publication Data
US 2022/0009831 A1     Jan. 13, 2022

(30) Foreign Application Priority Data
Nov. 7, 2018 (BE) ................................. 201805774

(51) Int. Cl.
*C04B 2/06* (2006.01)

(52) U.S. Cl.
CPC ..................... *C04B 2/06* (2013.01)

(58) Field of Classification Search
None
See application file for complete search history.

(56) References Cited

U.S. PATENT DOCUMENTS

| | | |
|---|---|---|
| 9,511,340 B2 | 12/2016 | Laurent |
| 2003/0121457 A1* | 7/2003 | Butters ............ C02F 1/542  423/430 |
| 2008/0011201 A1* | 1/2008 | Strachan ............ C04B 28/10  106/795 |
| 2011/0000403 A1 | 1/2011 | Tilquin et al. |
| 2014/0140907 A1† | 5/2014 | Belli et al. |
| 2015/0258519 A1† | 9/2015 | Laurent |
| 2017/0152175 A1* | 6/2017 | Kutlubay ............ C01F 11/02 |
| 2018/0065887 A1 | 3/2018 | Ingram et al. |
| 2019/0316844 A1† | 10/2019 | Denollin |

FOREIGN PATENT DOCUMENTS

| | | |
|---|---|---|
| EP | 0313483 A1 | 4/1989 |
| EP | 1292538 B1 | 11/2004 |
| EP | 1999082 B1 | 9/2009 |
| EP | 2920129 A1 | 9/2015 |
| EP | 2920128 B1 | 7/2020 |
| FR | 2776285 † | 9/1999 |
| WO | WO 0196240 A1 | 12/2001 |
| WO | WO 2006050567 A1 | 5/2006 |
| WO | WO 2014064234 A1 | 5/2014 |
| WO | 2015034477 † | 3/2015 |
| WO | WO 2018104448 A1 | 6/2018 |

OTHER PUBLICATIONS

Neomere Tech 646, 4 pages, 2009, available as early as Apr. 7, 2018 online, Chryso UK Ltd.†

\* cited by examiner
† cited by third party

*Primary Examiner* — Michael Forrest
(74) *Attorney, Agent, or Firm* — Kolitch Romano Dascenzo Gates LLC

(57) ABSTRACT

Disclosed is a lime milk comprising at least 40 wt. % of dry matter composed of hydrated lime; 0.1 to 3 dry wt. % of carbohydrate dispersants selected from monosaccharides, disaccharides, oligosaccharides, their alkoxide form and derivatives thereof obtained by oxidation or hydrogenation; 0.1 to 3 dry wt. % of a dispersant comprising polycarboxylic polyether copolymers obtained by copolymerization of unsaturated ethylene monomers having between 15 and 100 moles of C2-C3 oxyalkylene groups, and unsaturated ethylene monomers of mono- or dicarboxylic acids, and/or their salts and/or the C1-C4 alkyl esters thereof. In some aspects, the proportion between the dispersant of the carbohydrate type and the dispersant of the copolymer type is between 5:1 and 1:1; the particle size distribution of hydrated lime comprises at least 99% of particles having a size lower than 100 μm; at least 75% of particles having a size greater than 1.2 μm.

20 Claims, No Drawings

LIME MILK

This application is a U.S. National Phase application under 35 U.S.C. § 371 of International Application No. PCT/EP2019/080170, filed Nov. 5, 2019, and claims benefit to Belgian Patent Application No. BE 201805774, filed Nov. 7, 2018. The International Application was published in French on May 14, 2020 as WO 2020/094607 under PCT Article 21(2).

FIELD

The present invention relates to a lime milk (LM), in particular to a suspension with high lime concentration and stable over time.

BACKGROUND

Lime milk are well known in the state of the art. They are a colloidal suspension of an alkaline-earth hydroxide with dry matter concentrations in the region of 15 to 35 weight % of the total weight of the milk. This suspension is obtained either by slaking calcic lime CaO (quicklime) or dolomitic lime (Ca,Mg)O with excess water, or by mixing with water calcium hydroxide $Ca(OH)_2$ (slaked lime, calcium hydrate) or fully or partly hydrated dolomitic lime, or from dilution of calcium hydroxide or lime putty. The raw materials naturally contain impurities such as silica, alumina or iron oxide in a proportion of a few percent.

Lime milk is used in numerous applications as chemical reactant, for example in the treatment and depollution of drinking water, wastewater and sludge, as well as for the neutralization of acid waste and the pH adjustment in chemical and nonferrous metal industries. It is also used for depolluting acid flue gases, or in the building and agriculture sectors. The advantage of using lime in the form of a lime milk lies in the fact that it is then contained in a liquid medium not only allowing easier incorporation and reaction, but also limiting and even averting dust emissions that could cause problems under some conditions of use.

The dry matter concentration of a lime milk is an important characteristic since it allows better control over the amount of water employed when used. Some applications require an optimum concentration of reactants to allow a perfect reaction of the lime, or simply to reduce the energy needed to remove the water after use. This is the case for example when a lime milk is used for the coagulation and flocculation of particles in suspension, followed by dehydration thereof. The quantity of water also has a very significant impact on the volume to be transported, stored and handled entailing major technical and economic constraints. It is therefore in a user's interest to maximise this dry matter for transport and storage in order to reduce costs.

Reactivity, sedimentation and viscosity are properties of a lime milk that are directly impacted by the dry matter concentration and particle size thereof.

A lime milk is composed of individual particles of calcium hydroxide of which the tendency to sediment depends on the size of the particles in suspension, on the concentration of solid matter and on the viscosity of the lime milk. In addition to these parameters, the porosity of the lime and/or hydrate particles and the electrostatic charges of the particles play a part in sedimentation.

The viscosity or rheological behaviour of lime milk is an intrinsic characteristic impacted by their dry matter concentration. Lime milk having a dry matter content lower than 20% behave as Newtonian fluids in which shear stresses are proportional to the velocity gradient. With concentrations higher than 20%, behaviour becomes non-Newtonian of viscoelastic type, even Bingaman. The behaviour of such a body translates as an elastic state when the shear threshold is lower than a critical value, and as plastic behaviour when this shear threshold is exceeded. This behaviour is generally related to the existence of a three-dimensional structure that is only ruptured if sufficient force is applied. Therefore, if the stress applied to the fluid is lower than a threshold stress, no deformation occurs and the fluid does not flow. A minimum stress must be reached to cause flowing.

Also, other often irreversible rheological effects are ascertained with ageing of the suspensions. They are particularly caused by variations in specific surface area, the $Ca(OH)_2$ crystalline system, sedimentation of large particles and re-aggregating of particles. A stable lime milk is scarcely affected by this ageing since its intrinsic characteristics such as viscosity undergo little change.

The viscosity and stability of a lime milk are fundamental characteristics for application, use and handling thereof: preparation, packaging, transportation, flow, pumping. In the literature, the term «pumpable» suspension is used. The viscosity level must be such to allow their agitation (maintaining in suspension without settling, re-homogenisation, replacing in suspension) and their conveying (pipeline transport, pumping). Experimentally, this «pumpability» is obtained when the dynamic viscosity of the suspensions is lower than 2000 cP, preferably lower than 1500 cP (dynamic viscosity is expressed in centiPoise or mPa·s, measured at a shear rate of $5\ s^{-1}$). However, some parameters must at times be adapted to the size of the installations (tanks, type of agitation, transport pipelines, etc.).

In general, the viscosity of lime milk increases when the dry matter concentration increases, when the size of the particles in suspension decreases and when the matter in suspension has a high specific surface area. It is difficult to prepare concentrated lime milk having low viscosity, particles of small size and a dry matter content higher than about 30%.

In addition, most lime milk are not naturally stable over time. The instability of the suspension is seen as a major increase in viscosity, shear threshold and plastic viscosity. The ageing phase of the suspensions takes place either under static conditions (corresponding to a rest phase) or under dynamic conditions (corresponding to an agitation or sub-shear phase), or under mixed conditions (corresponding to alternating rest-agitation phases). Ageing under static conditions is also accompanied by more or less rapid sedimentation as a function of particle size, sporadically generating a still higher concentration of dry matter The ageing phases of the suspensions reflect routine industrial practice (encompassing production phases of storage, transport, pumping etc.). The agitation phases prevent sedimentation harmful to optimum use of the product. These rheological behaviours are more pronounced the greater the increase in shear stresses, time and dry matter content. They depend upon the very nature of the raw material but also on the fineness of the hydrate particles: coarse particles (a few tens of μm) are stable but have greater tendency to sediment, the fine particles (less than 10 μm) are generally less stable but resist sedimentation for a longer time.

The change in rheological behaviour of lime milk, in particular when they are highly concentrated, generates numerous drawbacks amongst which the fact that they are impossible to agitate or transport when there is an increase in dynamic viscosity, in shear threshold and in plastic viscosity, which often generates damage to equipment (pipelines, pump, agitator impeller, motor, early wear of agitator impellers . . . ) and high energy costs. It is therefore crucial to find a solution to the problem of the stability of suspensions to be marketed.

To stabilise lime milk, numerous dispersants used in other applications have been suggested such as acrylic, methacrylic acids or cationic and amphoteric polyelectrolytes having nitrogen-containing groups such as polyamines, polymers of diallyldimethylammonium chloride, polyphosphates. These agents improve the fluidity of concentrated $Ca(OH)_2$ suspensions but often cause a sudden rise in viscosity that is uncontrollable in that it strongly increases over time.

Other families of dispersants have been described, such as derivatives of water-soluble polysaccharides such as partially hydrolysed cellulose containing carboxyl groups and/or hydroxyalkyl groups and/or sulfate, partially hydrolysed starch having a high proportion of amylose and sulfoalkyl groups with 1 to 4 carbon atoms. These additives have low viscosity and plasticizing properties on mineral suspensions including cement, lime or gypsum. It has been shown that fructose and some mono- and disaccharides reduce the viscosity of aqueous lime suspensions.

Document EP 0 313 483 discloses several polyacrylates (water-soluble ethylenic polymer and/or copolymer) which, when added in a proportion of 500 to 20,000 ppm as grinding agents, allow the preparation of microparticulate aqueous lime suspensions with high concentration in dry matter, of low and stable viscosity, having particles of the desired size and a much improved reactivity.

Document EP 1 292 538 B1 discloses compositions comprising an aqueous paste of calcium hydroxide containing between 25 and 65 weight % of solid particles, an acidic polymer or water-soluble salt and a co-additive based on a whole range of possible salts.

Document WO 01/96240 A describes the use of anionic polysaccharides (polysaccharide derivatives obtained by oxidation e.g. inulin derivatives) as additive for stabilising the viscosity of calcic lime milk suspensions.

Document EP 1 999 082 B1 describes the use of carbohydrates selected from among monosaccharides, disaccharides, oligosaccharides or derivatives of carbohydrates obtained by oxidation or hydrogenation, as additives to stabilise the viscosity of calcic and/or magnesium lime milk suspensions.

Document WO 2006/050567 discloses a lime milk of low viscosity that uses a combination of glucose syrup and polycarboxylate copolymers as dispersants.

Document US 2018/0065887 A1 discloses a concentrated lime milk of mean particle size and stabilised over time under specific pH conditions by a dispersant additive of the polycarboxylate type.

None of the proposed solutions is suitable for maintaining over time the stability of highly concentrated suspensions of lime milk, under all the conditions encountered in industrial environments.

SUMMARY

In an embodiment, the present invention provides a lime milk comprising:
- at least 40 weight % of dry matter composed of hydrated lime;
- 0.1 to 3 dry weight % of carbohydrate dispersants selected from the group of monosaccharides, disaccharides, oligosaccharides, their alkoxide form and derivatives thereof obtained by oxidation or hydrogenation;
- 0.1 to 3 dry weight % of a dispersant from the family of polycarboxylic polyether copolymers obtained by copolymerization of unsaturated ethylene monomers having between 15 and 100 moles of C2-C3 oxyalkylene groups and unsaturated ethylene monomers of mono- or dicarboxylic acids, and/or their salts and/or the C1-C4 alkyl esters thereof, wherein the proportion between the dispersant of the carbohydrate type and the dispersant of the copolymer type is between 5:1 and 1:1;

the particle size distribution of hydrated lime being characterized by:
- at least 99% of particles having a size lower than 100 µm;
- at least 75% of particles having a size greater than 1.2 µm.

DETAILED DESCRIPTION

In an embodiment, the present invention provides a lime milk with high dry matter concentration having maintained stable rheological characteristics over time (such as dynamic viscosity, shear threshold or plastic viscosity and sedimentation) at levels that are compatible with optimum handling thereof over time under static, dynamic or mixed conditions. After a usual ageing period, these characteristics must therefore remain little changed.

The preferred embodiments of the invention comprise at least one or any suitable combination of the following characteristics:

- The particle size distribution of hydrated lime is characterized by:
  - at least 90% of particles having a size lower than 50 µm;
  - at least 90% of particles having a size greater than or equal to 0.8 µm.
- The particle size distribution of hydrated lime is characterized by:
  - at least 90% of particles having a size lower than 50 µm;
  - at least 50% of particles having a size lower than 15 µm, preferably lower than 8 µm;
  - at least 90% of particles having a size greater than or equal to 0.8 µm.
- The proportion of dry matter is between 45 and 60 weight %, said milk having a viscosity measured after 14 days of ageing, at 25° C. with a shear rate of 5 s−1, lower than 1500 cP (1.5 Pa·s), preferably lower than 1300 cP (1.3 Pa·s).
- The proportion of dry matter is between 45 and 60 weight %, said milk having viscosity measured on fresh lime milk, at 25° C. with a shear rate of 5 s−1, lower than 800 cP (0.8 Pa·s), preferably lower than 600 cP (0.6 Pa·s).
- The polycarboxylic polyether copolymer is the reaction product of at least one unsaturated ethylene monomer comprising:
  - between 75 and 95 mole % of C1-C3 alkoxypolyoxyalkylene (meth)acrylate and C1-C3 alkoxypolyoxyalkylene maleate wherein the degree of polymerization of oxyalkylene is between 15 and 100, preferably between 20 and 50;
  - between 5 and 25 mole % of (meth)acrylic acid, itaconic acid, crotonic acid, maleic acid, fumaric acid and the ammonium salts and alkali metals thereof.
- The alkoxypolyoxyalkylene of the dispersant copolymer comprises oxyalkylene units selected from among oxyethylene and oxypropylene.

The alkoxypolyoxyalkylene of the dispersant copolymer comprises oxyalkylene units selected from among oxyethylene and oxypropylene comprising from 5 to 95 units of oxyethylene and from 5 to 95 units of oxypropylene.

The acid group of the copolymer is obtained by copolymerization of (meth)acrylic acid.

The dispersant of the copolymer type has a weight average molecular weight of between 10 000 and 100 000 g/mol, preferably between 10 000 and 60 000 g/mol measured by gel permeation chromatography in tetrahydrofuran relative to polystyrene standards.

The polydispersity of the molecular weight of said copolymer is between 1.1 and 1.6, preferably between 1.3 and 1.4.

The dispersant of the copolymer type has a mean viscosity of between 0.2 and 1 Pa·s, preferably between 0.3 and 0.8 Pa·s and more preferably between 0.3 and 0.6 Pa·s measured at 25° C. with a shear rate between 0.1 and 400 s−1.

The present invention also discloses a method for preparing a lime milk whereby a liquid comprising the dispersants is contacted with a quick lime or hydrated lime allowing to obtain a lime milk according to the invention, and the use thereof for the neutralisation of acid waste, in particular in flue gases, and for sludge treatment.

Producers have been endeavouring to optimise the parameters of lime milk for many years. An increase in the quantity of dry matter (DM) is accompanied by an exponential increase in the viscosity of the product, making impossible any subsequent handling by equipment generally used for the manipulation of liquids in industry.

The present invention discloses a lime milk with high concentration of dry matter having viscosity and sedimentation characteristics that are sufficiently stable over time for optimum use thereof.

There are two types of additives which allow to control and stabilise the viscosity of lime milk: additives acting through chemisorption and additives acting through steric hindrance and/or electrostatic absorption effect. Chemisorption allows to stabilise the product over the long term, whereas the effect of steric hindrance and/or electrostatic absorption allows to reduce the viscosity of lime milk via dispersive effect.

According to the present invention, at least two types of additives are used which prove to have synergic effect. They are more specifically additives belonging to the family of carbohydrates and that of ionomer copolymers, preferably of the polyether polycarboxylate type, both being associated in optimised proportions.

The lime milk described in the present invention are composed of suspensions having a dry matter content of between 40 and 65%, preferably between 45 and 65% expressed in dry matter weight relative to the weight of the lime milk.

The lime milk of the present invention can be prepared by different methods:
1. by slaking calcic limes and/or dolomitic limes;
2. from hydrated lime and/or hydrated dolomitic lime in powder form;
3. by diluting pastes of calcium and/or magnesium hydrates.

These raw materials naturally contain impurities (silica, alumina, . . . ). The liquid used for the suspension is chiefly water. Other, non-aqueous, solvents can be envisaged as well as mixtures of non-aqueous solvents or mixtures of water and non-aqueous solvent(s).

The solid matter particles in suspension of alkaline-earth hydroxides meet the general formula a $Ca(OH)_2$.b $Mg(OH)_2$. c MgO in suspension in water wherein a, b and c are molar fractions with a+b+c between 90 and 100%; «a» preferably has a value of between 80% and 100%, advantageously a value of 100%.

It is preferable to have a lime milk characterized by a fine particle size distribution, ensuring longer suspension of the particles (slower sedimentation) and better chemical reactivity. The particle size distribution in the suspension has a maximum size represented by D99 of less than 150 μm, or preferably equal to or less than 100 μm, a mean particle size represented by D90 of less than 70 μm, preferably less than 50 μm, and a mean particle size represented by D50 of less than 15 μm, preferably less than 10 μm, even less than 8 μm, preferably accompanied by a mean particle size represented by D25 greater than 1 μm, preferably 1.2 μm, accompanied by a mean particle size represented by D10 greater than or equal to 0.5 μm, preferably 0.8 μm. The distributions D99, D90, D50, D25 and D10 correspond to the sizes for which respectively 99%, 90%, 50%, 25% or 10% of the particles by volume (or mass) are accordingly smaller or greater than said sizes. To adjust their particle size, these lime milk can be subjected to milling (e.g. of bead type), screening (e.g. on mesh) or any other means for reducing particle size.

Particle size distribution (PSD) is expressed as a cumulative percentage passing of particles as a function of the diameter of the particles and measured by laser diffraction (calculated in accordance with the Fraunhofer and/or Gustav Mie method). The distributions characterized by the terms D99 to D10 are interpolated values of the particle size distribution curve. The apparatus used is a Sympatec analyzer, HELOS (H2968), having a so-called «R4 » lens for analysing products between 1.8 and 350 μm.

Preferably, the lime milk according to the present invention is characterized by a dry matter content of at least 40%, preferably at least 45%, by fresh product viscosity lower than 800 cP (0.8 Pa·s), preferably lower than 600 cP (0.6 Pa·s), and by aged product viscosity lower than 2000 cP (2 Pa·s), preferably lower than 1500 cP (1.5 Pa·s), and even 1300 cP (1.3 Pa·s).

The viscosities of the lime milk of the present invention are measured on a viscometer: "Thermo Fischer Rheostress 6000" with "Haake C 25" cryostat equipped with a calibrated cylinder and "Haake Z 40" spindle (rotor) at a shear rate (i.e. shear velocity) of 5 $s^{-1}$. The measurement principle is well known and is based on immersing a spindle (rotor) into a calibrated cylindrical vessel containing the lime milk to be analysed at a temperature of 25° C. When the spindle (rotor) rotates in the lime milk, the milk opposes resistance to rotation due to its viscosity. The measurement protocol comprises an increase in rotation speed followed by a progressive decrease in the rotation speed of the spindle (rotor) allowing viscosity hysteresis to be observed as a function of viscosity rate. In the protocol of the present invention, the result of viscosity measurement is obtained by computing the mean of the viscosities corresponding to a shear rate of 5 s−1 respectively measured during a speed increase phase and a speed decrease phase of the spindle (rotor).

Among the additives of the carbohydrate type used in the present invention, a distinction is made between monosaccharides, disaccharides, oligosaccharides and polysaccharides. They are described in detail in Document EP 1 999 082 A1.

Among monosaccharides, as examples mention can be made of: erythrose, threose, xylose, ribose, allose, glucose, galactose, fructose, mannose.

Among disaccharides, as examples mention can be made of: sucrose, lactose, maltose, trehalose.

Among polysaccharides, as examples mention can be made of: starch, modified starch, hydrolysed starch, glycogen, inulin, modified inulin, cellulose, modified cellulose, pectins, dextrins and cyclodextrins.

Among modified carbohydrates, consideration is given to polyols which are hydrogenated forms. As examples, mention can made of sorbitol (or glucitol), erythritol, xylitol, lactitol, maltitol.

The family of polycarboxylic polyethers particularly comprises acrylic co- and ter-polymers. This family of polymers is described in detail in Documents EP 2 920 128 A1 and EP 2 920 129 A1; the commercial products of these types of polymers can be obtained for example under the trade name Rheosperse™ by Arkema.

Each of the additives used in combination are included in the composition of the lime milk of the present invention in an amount of 0.1 to 3 weight and preferably from 0.1 to 2 weight %. Their concentration is related to the concentration of dry matter. The higher the concentration of dry matter the more the concentration of the two additives must be increased. For dry matter concentrations of 35 to 40%, values of 0.1 to 0.3 can be worked with for each of the additives, whereas for dry matter concentrations of 50 to 60% the concentrations are rather more in the region of 0.7 to 1.5%.

The percentage of additive is expressed in dry matter weight of the additive relative to the total dry matter content by weight of the lime milk. For one kilogram of lime milk with 50% dry matter concentration, which therefore contains 500 g of calcium hydrate and impurities, 2 weight % of additive therefore represents 10 g of additional dry matter and therefore 510 g of dry matter per kilogram of lime milk.

This proportion of polyether polycarboxylates/carbohydrates will not only depend on dry matter concentration but also on the type of raw materials and on ageing conditions, etc. The purpose of adjusting additive concentration is to meet the criterion of rheological stability of lime milk. The requirements of the producer, client and conditions of use must all be met. This concentration is to be minimised in particular for reasons of cost.

The choice of one or more additives used in a mixture can also be determined according to application. Some applications have strict requirements in terms of food compatibility, heed of environmental standards, process compatibility, etc. Other criteria such as economy, availability, packaging, ease of use can also guide this choice.

In general, the additives related to the invention can be included in the composition of the lime milk in several manners. The recourse to these additives is not at all detrimental to the preparation of the lime milk and has the advantage of being modular. Indeed, they can be added in one step or in several steps over the different packaging phases of the raw materials or during the preparation of the lime milk of the present invention.

For example, these steps are the hydrating or slaking of the lime, milling of the lime and/or hydrate, preparation of the lime milk, storage, transportation, etc. In more detail, the method for preparing a stable lime milk with respect to changes in rheological characteristics over time can be envisaged under static, dynamic or mixed conditions (alternation of one of more static and dynamic phases). This method can therefore be carried out by:

a. incorporation, by mixing one of the solid additives or an aqueous solution, in a previously prepared lime milk;
b. incorporation, by mixing a solid additive or an aqueous solution, in the preparation liquid of the lime milk followed by incorporation of the slaked lime by mixing;
c. incorporation, by mixing a solid additive or an aqueous solution, in the preparation liquid of the lime milk to be used for slaking the quicklime (CaO. or dolomitic lime) and slaking the lime with this liquid;
d. mixing dry anhydrous slaked lime (or dolomitic lime) with a solid additive and placing the mixture in suspension in water;
e. mixing a solid additive with quick lime (CaO or dolomitic lime) and slaking the quick lime with water;
f. impregnating dry anhydrous slaked lime (or dolomitic lime) with an aqueous solution of a solid additive;
g. impregnating quick lime (Ca(or dolomitic lime) with an aqueous solution of a solid additive.

Preparation protocol for examples preparation of a mixture of water and additives in precise proportions;

agitation with propeller blade agitator at a speed of 300 rpm for a few minutes;

weighing and gradual addition of the hydrated lime while maintaining agitation for 15 to 20 minutes.

Measurements of lime milk characteristics:

measurement of dry matter: by monitoring loss-on-drying in an infrared balance;

measurement of dynamic viscosity on fresh product: measuring the viscosity of the lime milk with a viscometer of "Thermo Fischer Rheostress 6000" type with "Haake C 25" cryostat equipped with a calibrated cylinder and "Haake Z 40" spindle (rotor) at a shear rate of 5 s−1 and at 25° C. within one hour after production time;

measurement of dynamic viscosity on aged product: the lime milk is left in storage in a tank. Every hour it is agitated 5 minutes so that settling does not lead to caking of the hydrate in the bottom of the tank and clogging of lime milk transport pipelines. Viscosity is measured on a sample after 14 days, using a viscometer of "Thermo Fischer Rheostress 6000" type with "Haake C 25" cryostat equipped with a calibrated cylinder and "Haake Z 40" spindle (rotor) at a shear rate of 5 s−1 and at 25° C.

measurement of settling: measured by leaving a sample of lime milk to stand for 24 hours in a 250 ml graduated cylinder, and determining the volume of supernatant in relation to the initial volume, which must be as low as possible. A lime milk is considered to cause problems as soon as settling reaches higher than 25%.

Series of Tests

Test series 1: Relationship between viscosity and settling as a function of dry matter Lime milk with different dry matter contents were prepared following the method described above, but without dispersion-promoting additive. A standard hydrate was used, called S97 of which the main characteristics are given in Table 1. Viscosities of fresh lime milk and of aged lime milk, i.e. after a storage of 14 days, are given in Table 2 according to the protocols described above. A lime milk is considered to be of good quality in terms of viscosity when fresh product viscosity at 5 s$^{-1}$ is lower than 800 cP and when viscosity after a storage of 14 days at 5 s$^{-1}$ is lower than 2000 cP, preferably lower than 1500 cP, and more preferably lower than 1300 cP. Settling after standing for 24 h is also given.

TABLE 1

Characteristics of the hydrate used

| Ca(OH)$_2$ (%) | C (%) | Al$_2$O$_3$ (%) | FeO (%) | MgO (%) | S (%) | SiO$_2$ (%) | X50 (μm) | X90 (μm) | X99 (μm) |
|---|---|---|---|---|---|---|---|---|---|
| 96.61% | 0.24% | 0.032% | 0.051% | 0.408% | 0.024% | 0.084% | 5.3 | 26.4 | 64.7 |

The particle size distribution chosen for the series of tests 1 to 3 is the following:

| D$_{10}$ (μm) | D$_{25}$ (μm) | D$_{50}$ (μm) | D$_{90}$ (μm) | D$_{99}$ (μm) |
|---|---|---|---|---|
| 1.1 | 2.1 | 5.3 | 26.4 | 64.7 |

TABLE 2 lime milk without additives

| Ex. No | Dry matter (%) | Fresh viscosity at 5 s−1 (cP) | Aged viscosity at 5 s−1 (cP) | Settling after standing 24 h |
|---|---|---|---|---|
| 2.1 | 20 | 24 | 529 | 30% |
| 2.2 | 35 | 1048 | 8524 | 5% |
| 2.3 | 50 | >10000 | >10000 | <2% |

It is noted that lime milk with low dry matter content have low viscosity which contributes towards inducing major settling on standing and requires regular and constant agitation on industrial scale to prevent any depositing and clogging of pipelines. Increasing the dry matter content of a lime milk reduces this propensity to settle by increasing viscosity and increasing the number of particles per volume unit, but there is a limit that must not be exceeded to avoid any problem related to a too-high viscosity (above 1300 cP or m·Pa·s). Producing additive-free lime milk therefore becomes an issue over and above a dry matter content of 30%.

Test series 2: Tests with only one additive and comparison with two additives

Lime milk with 50% dry matter content were prepared following the method described above, but this time with only one of the additives used.

the polyether polycarboxylate used in the present invention is composed of:

13 weight % of methacrylic acid monomers fully neutralised by NaOH;

87 weight % of polyether methacrylate monomers in which the polyether comprises 60 ethylene oxide units.

It has a weight average molecular weight (Mw) of 1655 000 and Mw/Mn polydispersity of 1.35.

The polyether polycarboxylate is used in a mixture in water containing 60 weight % water and 40 weight % polyether polycarboxylate.

The carbohydrate used in the present invention is sucrose in a mixture with water comprising 35 weight % water and 65 weight sucrose.

The concentrations of the additives are given in weight percent of the active substance of the additive.

Therefore, 1 weight % of the water/polyether polycarboxylate mixture contains 0.4 weight % of polyether polycarboxylate, and 1 weight % of the water/sucrose mixture contains 0.65 weight % of sucrose.

The purpose is to reduce the viscosity of the fresh product, but also that of the lime milk stored for 14 days under industrial conditions, whilst maintaining low-level settling. The standard hydrate of Example 1 was used. The same characteristics as those of Example 1 are given in Table 3. Only the lime milk produced with two additives are the subject of the present invention. The other lime milk are given by way of comparison since they contain only one additive.

TABLE 3

Milk with 50% dry matter and only one additive producing less than 2% settling after being left to stand 24 h

| Ex. No | Additive | Additive content | Viscosity of fresh at 5 s−1 (cP) | Viscosity of aged at 5 s−1 (cP) |
|---|---|---|---|---|
| 3.1 | — | 0% | >10000 | >10000 |
| 3.2 | polymer carboxylate | 0.5% | 135 | >10000 |
| 3.3 | polymer carboxylate | 1.0% | 67 | 1627 |
| 3.4 | polymer carboxylate | 1.5% | 40 | 1402 |
| 3.5 | polymer carboxylate | 2.0% | 26 | 1349 |
| 3.6 | Carbohydrates | 0.5% | 2549 | 3722 |
| 3.7 | Carbohydrates | 1.0% | 1968 | 2170 |
| 3.8 | Carbohydrates | 1.5% | 1423 | 1651 |
| 3.9 | Carbohydrates | 2.0% | 881 | 1421 |

The addition of additives alone allows to obtain good viscosity results on fresh lime milk, and good behaviour in terms of settling due to the high content of dry matter. However, none of the additives used alone allows to maintain the viscosity of the milk, stored for 14 days under industrial conditions, below the recommended value of 1300 cP at 5 s$^{-1}$.

TABLE 4

Milk with 50% dry matter and two additives producing less than 2% settling after being left to stand 24 h

| Ex. No | Polymer carboxylates | Carbohydrates | Viscosity of fresh at 5 s−1 (cP) | Viscosity of aged at 5 s−1 (cP) |
|---|---|---|---|---|
| 4.1 | 0.05% | 0.05% | 1853 | 3458 |
| 4.2 | 0.1% | 0.1% | 745 | 1253 |
| 4.3 | 0.2% | 0.2% | 642 | 1041 |
| 4.4 | 0.3% | 0.3% | 329 | 892 |
| 4.5 | 0.5% | 0.5% | 36 | 197 |

Only milk N° 4.2, 4.3, 4.4 and 4.5 in Table 4, subject of the present invention, allow to reach the objective of the aged milk having viscosity lower than 1300 cP at 5 s−1, with an overall additive concentration lower than or equal to 1%.

Test series 3: Tests with two additives and different concentrations

In the light of these results, the polyether polycarboxylate and sucrose additives were used to obtain lime milk, still from the calcium hydrate in Example 1, in different concentrations, for the purpose of showing the limit of synergy when using these two additives concomitantly as a function of dry matter content. Some of the lime milk in the preceding examples are reproduced in the Tables.

Table 5 gives the concentrations of the two additives required for increasingly higher concentrations of dry matter.

It can be seen that for increasing concentrations of dry matter, increasing concentrations of dispersion additives are also needed.

TABLE 5

Lime milk with use of both additives

| Ex. No | Dry matter (%) | Polymer carboxylates | Carbohydrates | Viscosity of fresh at 5 s−1 (cP) | Viscosity of aged at 5 s−1 (cP) | Settling after standing 24 h |
|---|---|---|---|---|---|---|
| 5.1 | 40 | 0.1% | 0.1% | 221 | 751 | 4.7% |
| 5.2 |  | 0.2% | 0.2% | 103 | 246 | 3.2% |
| 5.3 |  | 0.5% | 0.5% | 8 | 9 | <2% |
| 5.4 | 45 | 0.1% | 0.1% | 453 | 1092 | <2% |
| 5.5 |  | 0.2% | 0.2% | 391 | 785 | <2% |
| 5.6 |  | 0.3% | 0.3% | 244 | 516 | <2% |
| 5.7 |  | 0.5% | 0.5% | 22 | 123 | <2% |
| 5.8 | 50 | 0.05% | 0.05% | 1853 | 3458 | <2% |
| 5.9 |  | 0.1% | 0.1% | 745 | 1253 | <2% |
| 5.10 |  | 0.2% | 0.2% | 642 | 1041 | <2% |
| 5.11 |  | 0.3% | 0.3% | 329 | 892 | <2% |
| 5.12 |  | 0.5% | 0.5% | 36 | 197 | <2% |
| 5.13 | 55 | 0.5% | 0.5% | 158 | 5463 | <2% |
| 5.14 |  | 0.7% | 0.7% | 146 | 947 | <2% |
| 5.15 |  | 1.0% | 1.0% | 127 | 57 | <2% |
| 5.16 | 60 | 0.5% | 0.5% | 400 | >10000 | <2% |
| 5.17 |  | 0.7% | 0.7% | 387 | 4531 | <2% |
| 5.18 |  | 1.0% | 1.0% | 308 | 678 | <2% |

TABLE 6

Lime milk with use of both additives in different proportions

| No | Dry matter (%) | Carboxylate polymers | Carbohydrates | Viscosity of fresh at 5 s−1 (cP) | Viscosity of aged at 5 s−1 (cP) | Settling after 24 h standing |
|---|---|---|---|---|---|---|
| 6.1 | 40 | 0.1% | 0.1% | 221 | 751 | 4.7% |
| 6.2 |  | 0.1% | 0.2% | 189 | 428 | 3.8% |
| 6.3 | 45 | 0.1% | 0.1% | 453 | 1092 | <2% |
| 6.4 |  | 0.1% | 0.2% | 415 | 897 | <2% |
| 6.5 |  | 0.1% | 0.3% | 398 | 826 | <2% |
| 6.6 | 50 | 0.1% | 0.1% | 745 | 1253 | <2% |
| 6.7 |  | 0.1% | 0.2% | 923 | 1148 | <2% |
| 6.8 |  | 0.2% | 0.2% | 642 | 1041 | <2% |
| 6.9 |  | 0.2% | 0.3% | 571 | 981 | <2% |
| 6.10 |  | 0.2% | 0.5% | 494 | 929 | <2% |
| 6.11 | 55 | 0.5% | 0.5% | 158 | 5463 | <2% |
| 6.12 |  | 0.5% | 0.7% | 155 | 3431 | <2% |
| 6.13 |  | 0.7% | 0.7% | 146 | 947 | <2% |
| 6.14 |  | 0.7% | 1.0% | 139 | 520 | <2% |
| 6.15 |  | 0.7% | 1.5% | 131 | 306 | <2% |
| 6.16 | 60 | 0.7% | 0.7% | 387 | 4531 | <2% |
| 6.17 |  | 0.7% | 1.0% | 342 | 2421 | <2% |
| 6.18 |  | 0.7% | 1.5% | 339 | 1194 | <2% |
| 6.19 |  | 0.7% | 2.0% | 320 | 946 | <2% |

Test series 4: Tests with two additives and particle size characteristics

In the light of these results, different lime milk were prepared using different hydrates chemically dose to the one described in Example 1, but with different particle size distributions. The resulting lime milk are characterized in terms of laser particle size distribution (PSD) and compared with a lime milk from the preceding examples.

TABLE 7 lime milk with 50% dry matter and different particle size distributions at different dispersant concentrations, exhibiting less than 2% settling after 24 h

| Ex No | Polymer carboxylates | Carbohydrates | Viscosity of fresh at 5 s−1 (cP) | Viscosity of aged at 5 s−1 (cP) | $D_{10\,(\mu m)}$ | $D_{25\,(\mu m)}$ | $D_{50\,(\mu m)}$ | $D_{90\,(\mu m)}$ | $D_{99\,(\mu m)}$ |
|---|---|---|---|---|---|---|---|---|---|
| 7.1 | 0.5% | 0.5% | 36 | 197 | 1.1 | 2.1 | 5.3 | 26.4 | 64.7 |
| 7.2 | 0.5% | 0.5% | 33 | 189 | 1.0 | 1.7 | 4.3 | 36.7 | 70.1 |
| 7.3 | 0.5% | 0.5% | 59 | 251 | 1.0 | 1.6 | 3.23 | 18.1 | 45.2 |
| 7.4 | 0.5% | 0.5% | 231 | 824 | 0.8 | 1.3 | 2.4 | 8.0 | 16.8 |
| 7.5 | 0.5% | 0.5% | 548 | 1453 | 0.7 | 1.1 | 2.2 | 6.0 | 10.4 |
| 7.6 | 0.5% | 0.5% | 742 | 1786 | 0.6 | 1.0 | 1.9 | 5.3 | 9.5 |
| 7.7 | 1.0% | 1.0% | <30 | 122 | 1.1 | 2.1 | 5.3 | 26.4 | 64.7 |
| 7.8 | 1.0% | 1.0% | <30 | 103 | 1.0 | 1.7 | 4.3 | 36.7 | 70.1 |
| 7.9 | 1.0% | 1.0% | <30 | 143 | 1.0 | 1.6 | 3.23 | 18.1 | 45.2 |
| 7.10 | 1.0% | 1.0% | 206 | 791 | 0.8 | 1.3 | 2.4 | 8.0 | 16.8 |
| 7.11 | 1.0% | 1.0% | 425 | 1350 | 0.7 | 1.1 | 1.9 | 5.3 | 9.5 |
| 7.12 | 1.5% | 1.5% | <30 | 83 | 1.1 | 2.1 | 5.3 | 26.4 | 64.7 |
| 7.13 | 1.5% | 1.5% | <30 | 74 | 1.0 | 1.7 | 4.3 | 36.7 | 70.1 |
| 7.14 | 1.5% | 1.5% | <30 | 95 | 1.0 | 1.6 | 3.23 | 18.1 | 45.2 |
| 7.15 | 1.5% | 1.5% | 187 | 474 | 0.8 | 1.3 | 2.4 | 8.0 | 16.8 |
| 7.16 | 1.5% | 1.5% | 305 | 1305 | 0.7 | 1.1 | 1.9 | 5.3 | 9.5 |

Examples 7.5 and 7.6 as well as 7.11 and 7.16 with polyether polycarboxylate and carbohydrate concentrations (0.5+0.5%; 1.0+1.0% and 1.5+1.5%) are comparative examples showing that too-fine particles tend to increase the viscosity of the mixture above a threshold that is considered to be acceptable. For a $D_{99}$ in the region of 15 µm and $D_{50}$ in the region of 2, the viscosity of the aged sample tends towards an unacceptable threshold, which can be partially offset by increasing the concentration of carbohydrate and polyether polycarboxylate. Persons skilled in the art will nevertheless endeavour to limit additives for reasons of cost.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A lime milk comprising:
   at least 40 weight % of dry matter composed of hydrated lime;
   0.1 to 3 dry weight % of carbohydrate dispersants selected from a group of monosaccharides, disaccharides, oligosaccharides, alkoxide forms of the monosaccharides, disaccharides, and oligosaccharides, and derivatives thereof obtained by oxidation or hydrogenation;
   0.1 to 3 dry weight % of a dispersant from a family of polycarboxylic polyether copolymers obtained by copolymerization of unsaturated ethylene monomers having between 15 and 100 moles of C2-C3 oxyalkylene groups, and unsaturated ethylene monomers of mono-or dicarboxylic acids, and/or their salts and/or C1-C4 alkyl esters thereof, wherein a proportion between the dry weight % of the dispersant of the carbohydrate type and the dry weight % of the dispersant of the copolymer type is between 5:1 and 1:1;
   wherein a particle size distribution of hydrated lime includes:
   at least 99% of particles having a size lower than 100 µm;
   at least 75% of particles having a size greater than 1.2 µm.

2. The lime milk according to claim 1, wherein the particle size distribution includes:
   at least 90% of particles having a size lower than 50 μm;
   at least 90% of particles having a size greater than or equal to 0.8 μm.

3. The lime milk according to claim 1, wherein the particle size distribution includes:
   at least 90% of particles having a size lower than 50 μm;
   at least 50% of particles having a size lower than 15 μm;
   at least 90% of particles having a size greater than or equal to 0.8 μm.

4. The lime milk according to claim 1, wherein the proportion of dry matter is between 45 and 60 weight %, said milk having a viscosity after ageing for 14 days, measured at 25° C. with a shear rate of 5 s-1, lower than 1500 cP (1.5 Pa·s).

5. The lime milk according to claim 1, wherein the proportion of dry matter is between 45 and 60 weight %, said milk having a viscosity measured on fresh milk, at 25° C. with a shear rate of 5 $s^{-1}$, lower than 800 cP (0.8 Pa·s).

6. The lime milk according to claim 1, wherein the polycarboxylic polyether copolymer is the reaction product of at least one unsaturated ethylene monomer comprising:
   between 75 and 95 mole % of C1-C3 alkoxypolyoxyalkylene (meth) acrylate and C1-C3 alkoxypolyoxyalkylene maleate wherein the polymerization degree of oxyalkylene is between 15 and 100;
   between 5 and 25 mole % of (meth) acrylic acid, itaconic acid, crotonic acid, maleic acid, fumaric acid and the ammonium salts and the alkali metals thereof.

7. The lime milk according to claim 6, wherein the alkoxypolyoxyalkylene of the dispersant copolymer comprises oxyalkylene units selected from among oxyethylene and oxypropylene.

8. The lime milk according to claim 6, wherein the alkoxypolyoxyalkylene of the dispersant copolymer comprises oxyalkylene units selected from among oxyethylene and oxypropylene, comprising from 5 to 95 oxyethylene units and from 5 to 95 oxypropylene units.

9. The lime milk according to claim 1, wherein the acid group of the copolymer is obtained by copolymerization of (meth) acrylic acid.

10. The lime milk according to claim 1, wherein the dispersant of copolymer type has a weight average molecular weight comprised between 10 000 and 100 000 g/mol measured by gel permeation chromatography in tetrahydrofuran relative to polystyrene standards.

11. The lime milk according to claim 1, wherein the polydispersity of the molecular weight of said copolymer is between 1.1 and 1.6.

12. The lime milk according to claim 1, wherein the dispersant of the copolymer type has a mean viscosity of between 0.2 and 1 Pa·s measured at 25° C. with a shear rate of between 0.1 and 400 $s^{-1}$.

13. A method for preparing the lime milk according to claim 1, the method comprising contacting a liquid comprising the dispersants with a quicklime or hydrated lime.

14. A method comprising (1) neutralizing flue gases comprising acid waste or (2) treating sludge, wherein the neutralizing and the treating comprises contacting the flue gases or the sludge with the lime milk according to claim 1.

15. The lime milk according to claim 1, wherein the proportion between the dispersant of the carbohydrate type and the dispersant of the copolymer type is between 3:1 and 1:1.

16. The lime milk according to claim 1, wherein the particle size distribution of hydrated lime includes at least 99% of particles having a size lower than 75 μm.

17. The lime milk according to claim 3, wherein the particle size distribution of hydrated lime includes at least 50% of particles having a size lower than 8 μm.

18. The lime milk according to claim 1, wherein the proportion of dry matter is between 45 and 60 weight %, said milk having a viscosity after ageing for 14 days, measured at 25° C. with a shear rate of 5 $s^{-1}$, lower than 1300 cP (1.3 Pa·s).

19. The lime milk according to claim 1, wherein the proportion of dry matter is between 45 and 60 weight %, said milk having a viscosity measured on fresh milk, at 25° C. with a shear rate of 5 $s^{-1}$, lower than 600 cP (0.6 Pa·s).

20. The lime milk according to claim 1, wherein the particle size distribution further includes 25% of particles having a size less than or equal to 1.2 μm.

* * * * *